US011853990B2

(12) United States Patent
Speiser et al.

(10) Patent No.: US 11,853,990 B2
(45) Date of Patent: Dec. 26, 2023

(54) SYSTEMS AND METHODS FOR PROVIDING A POINT OF SALE PLATFORM

(71) Applicant: FIRST DATA CORPORATION, Brookfield, WI (US)

(72) Inventors: Leonard Speiser, Mountain View, CA (US); John Beatty, Mountain View, CA (US); Michael Quinlan, Mountain View, CA (US); Arvin C. Haywood, Mountain View, CA (US); Jacques Grove, Mountain View, CA (US)

(73) Assignee: FIRST DATA CORPORATION, Brookfield, WI (US)

( * ) Notice: Subject to any disclaimer, the term of this patent is extended or adjusted under 35 U.S.C. 154(b) by 184 days.

(21) Appl. No.: 17/479,879

(22) Filed: Sep. 20, 2021

(65) Prior Publication Data

US 2022/0005012 A1 Jan. 6, 2022

Related U.S. Application Data

(63) Continuation of application No. 16/418,995, filed on May 21, 2019, now Pat. No. 11,151,536, which is a continuation of application No. 14/750,386, filed on Jun. 25, 2015, now abandoned, which is a continuation of application No. PCT/US2013/077676, filed on Dec. 24, 2013.

(60) Provisional application No. 61/794,772, filed on Mar. 15, 2013, provisional application No. 61/745,955, filed on Dec. 26, 2012.

(51) Int. Cl.
*G06Q 20/20* (2012.01)
*G06Q 20/12* (2012.01)
*G06Q 20/22* (2012.01)
*G06Q 30/06* (2023.01)

(52) U.S. Cl.
CPC .......... *G06Q 20/202* (2013.01); *G06Q 20/12* (2013.01); *G06Q 20/20* (2013.01); *G06Q 20/223* (2013.01); *G06Q 30/06* (2013.01)

(58) Field of Classification Search
CPC ...... G06Q 20/202; G06Q 20/12; G06Q 20/20; G06Q 20/223; G06Q 30/06
See application file for complete search history.

(56) References Cited

U.S. PATENT DOCUMENTS

| | | |
|---|---|---|
| 2009/0132424 A1 | 5/2009 | Kendrick et al. |
| 2011/0055029 A1 | 3/2011 | Nicolas |
| 2011/0125566 A1 | 5/2011 | McLaughlin et al. |
| 2012/0191522 A1* | 7/2012 | McLaughlin .......... G06Q 30/02 705/26.8 |
| 2013/0103515 A1* | 4/2013 | Fisher .................. G06Q 20/102 705/42 |

(Continued)

*Primary Examiner* — Paul Danneman
(74) *Attorney, Agent, or Firm* — FOLEY & LARDNER LLP

(57) ABSTRACT

This disclosure describes systems, methods, and computer-readable media related to providing a point of sale platform. In some embodiment, a point of sale (POS) device may receive information associated with an order and payment information associated with the order. The POS device may generate a first object based at least in part on the information associated with the order and a second object based at least in part on the payment information. The POS device may store the first object and the second object in a queue. The POS device may transmit the first object and the second object to a remote server.

18 Claims, 5 Drawing Sheets

(56) References Cited

U.S. PATENT DOCUMENTS

2014/0025516 A1    1/2014   Argue et al.

* cited by examiner

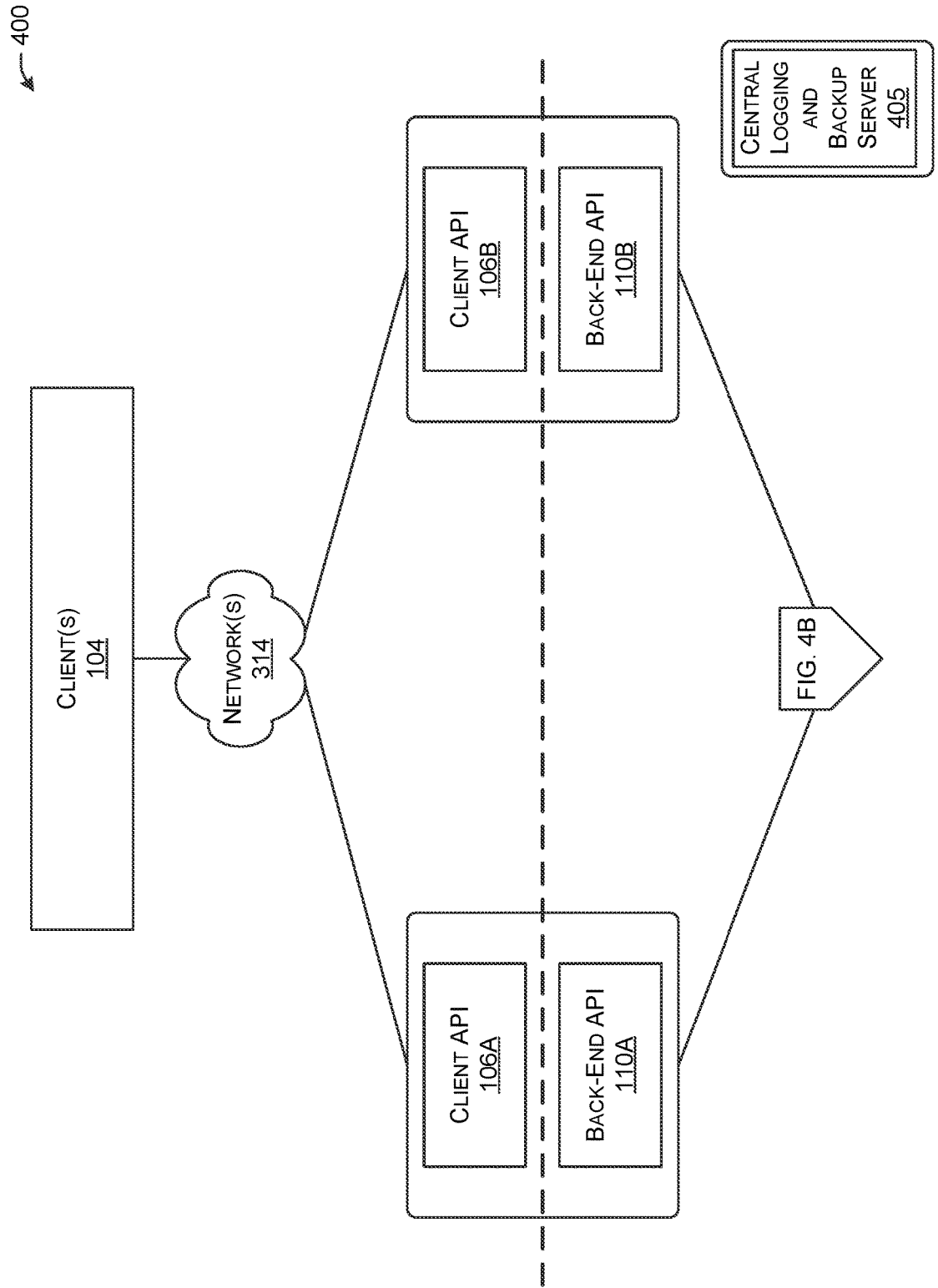

SYSTEMS AND METHODS FOR PROVIDING A POINT OF SALE PLATFORM

CROSS-REFERENCE TO RELATED PATENT APPLICATIONS

This application is a continuation of U.S. patent application Ser. No. 16/418,995, filed on May 21, 2019, which is a continuation of U.S. patent application Ser. No. 14/750,386, filed Jun. 25, 2015 and which claims priority to PCT Application No. PCT/US2013/077676 filed on Dec. 24, 2013, U.S. Provisional Patent Application No. 61/745,955 filed on Dec. 26, 2012, and U.S. Provisional Patent Application No. 61/794,772 filed on Mar. 15, 2013, all of which are incorporated by reference in their entireties herein.

FIELD OF DISCLOSURE

This disclosure relates generally to systems and methods for providing a point of sale platform, and in particular to providing a platform system and associated methods for mobile and web-based applications to interface with electronic commerce systems.

BACKGROUND

Electronic commerce technology for small and medium businesses (SMB) has made it easier for the SMB owners to keep track of their accounting and finances. Web-based store fronts have made sales of products and services easier for the SMB owners as well.

However, existing e-commerce and web-based store fronts have not adequately resolve the problem of physical retail businesses. The entire ecosystem of sales of products or services at a retail store remains scattered. Business owners must each work on a way to move sales data from a point of sales terminal separately to an accounting database, a financials database, an inventory database, or an order tracking database. Even when some of the movement of data is optimized, the different commercial management services lack integration in a singular scalable platform. Thus, a need remains for an effective point of sale platform system that may overcome the issues with the existing e-commerce services and products. Solutions to these problems have been long sought but prior developments have not taught or suggested any solutions. Accordingly, viable solutions to these problems have eluded those skilled in the art.

BRIEF DESCRIPTION OF THE DISCLOSURE

The present disclosure provides a point-of-sale (POS) platform system and associated methods for mobile and web-based applications to interface with electronic commerce systems. In certain embodiments, the POS platform is designed to be a multi-tenant system that allows separation of merchants within the same system. This may allow a single platform to service merchants or merchant groups. This platform system may enable operation of POS terminal devices through the POS platform without store credit card information and thus increases the security measures of platform.

In certain embodiments, the POS platform may include a cloud-based service server system for centralized electronic commerce services. The POS platform may also include application programming interfaces for any electronic device to turn into a valid and reliable POS terminal. The POS platform may further include application programming interfaces to plug into a multiplicity of back-end commercial processes, such as analytics and payment processors, already provided by third party vendors. One aspect of this disclosure may include having a disaster recovery mechanism, such as the ability for any client device serving as a POS terminal to work in an offline mode.

Some embodiments of the disclosure may have other aspects, elements, features, operations, acts, and steps in addition to or in place of what is described above. These potential additions and replacements are described throughout the rest of the specification.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements, which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

FIG. 4A is a diagrammatic representation of an example architecture of a service application tier of the service server system in accordance with one or more embodiments of the disclosure.

DETAILED DESCRIPTION

Figure 1:
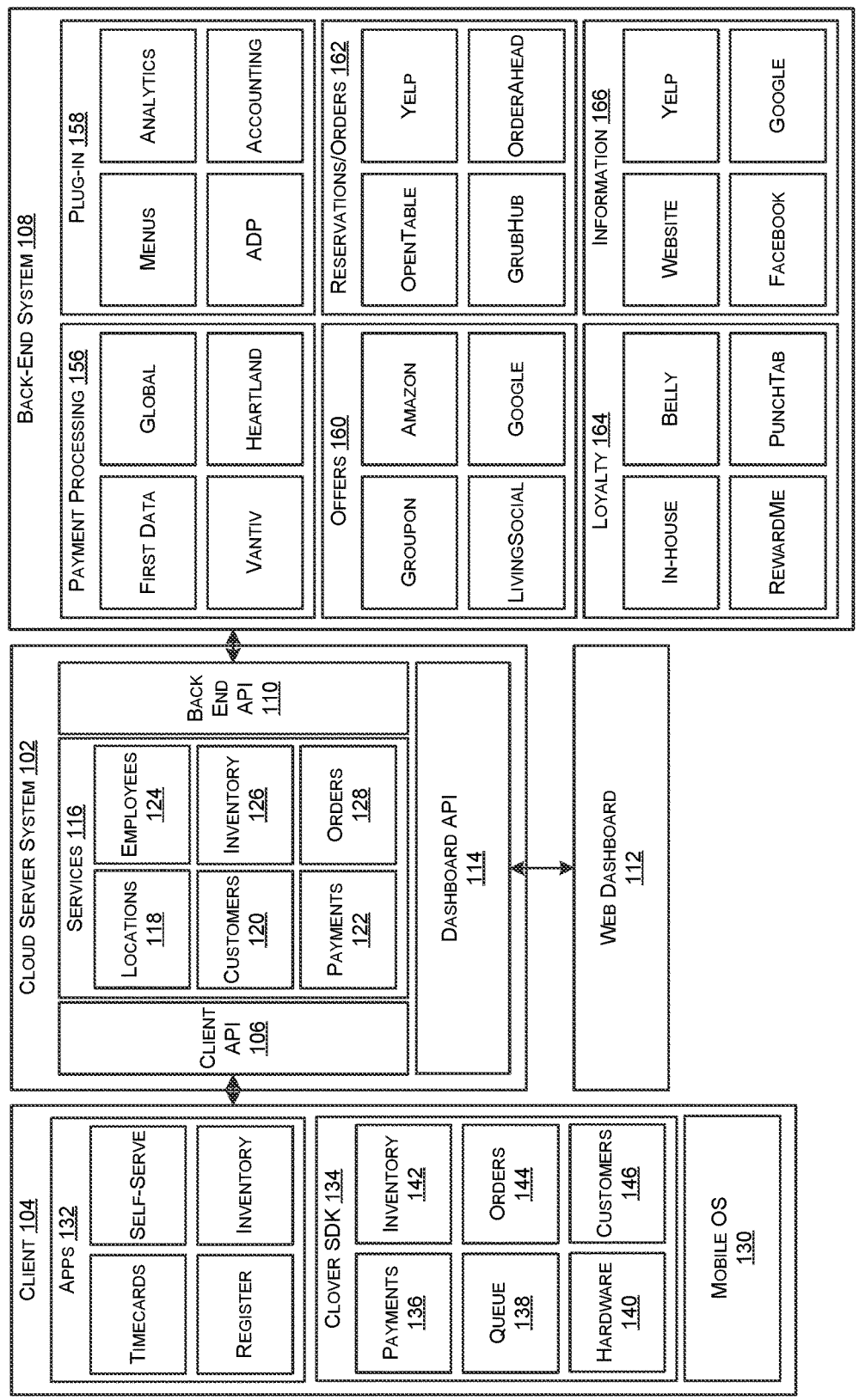
FIG. 1 is an example system architecture of a point-of-sale platform system in accordance with one or more embodiments of the disclosure.

Referring now to FIG. 1, therein is shown a system architecture of a POS platform system 100 according to certain embodiments of the disclosure. The POS platform system 100 may include a service server system 102. The service server system 102 may be implemented by a computer system, such as the computer system 300 of FIG. 3. In some embodiments, the service server system 102 may be a cloud-based computer system, where no on-premise servers are required, which greatly reduces cost and complexity of hardware, installation and ongoing maintenance and administration.

The POS platform system 100 may include one or more of a client terminal 104. The client terminal 104 may be a mobile device, a laptop computer, a desktop computer, other device with computer functionalities, or any combination thereof. For example, the client terminal 104 may be a purpose-built point-of-sale equipment, self-service kiosk, a smart phone, tablet, wearable computer device, or e-reader operating a mobile operating system, such as Android OS™. The client terminal 104 may be coupled to the service server system 102 via a client API 106. The client API 106 may be an application programming interface for the client terminal 104 to access the services and functionalities provided by the service server system 102. The client terminal 104 may communicate with the service server system 102 via a network channel.

The POS platform system 100 may also include a back-end system 108. The back-end system 108 may be one or more independent computer systems, such as instances of the computer system 300 of FIG. 3, for performing back-end processes for sales transactions. The back-end system 108 may be coupled to the service server system 102 via a back-end API 110. The back-end API 110 may be an application programming interface for the back-end system 108 to supplement the services provided by the service server system 102. The back-end system 108 may communicate with the service server system 102 via the network channel as well.

Further, the POS platform system 100 may also include a web dashboard 112. The web dashboard 112 may be generated via a web browser on any device with computer functionalities, such as a mobile device, a tablet, or the computer system 300 of FIG. 3. The web dashboard 112 may provide an interface for a merchant to manage the services provided by the service server system 102. The web dashboard 112 may be coupled to the service server system 102 via a dashboard API 114. The dashboard API 114 may be an application programming interface for the web dashboard 112 to access the data and the services provided by the service server system 102. The web dashboard 112 may communicate with the service server system 102 via the network channel as well. In some embodiments, the web dashboard 112 may also provide a customer interface similar to one provided by the client terminal 104 over the web.

The network channel may be a system for communication. The network channel may encompass a variety of mediums of communication, such as wired communication for one part and wireless communication for another part. The network channel may be part of the Internet.

For example, the network channel may include an Ethernet or other wire-based network or a wireless NIC (WNIC) or wireless adapter for communicating with a wireless network, such as a WI-FI network. The network channel may include any suitable network for any suitable communication interface. As an example and not by way of limitation, the network channel may include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the network channel may be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the network channel may use standard communications technologies and/or protocols. Thus, the network channel may include links using technologies such as Ethernet, 802.11, worldwide interoperability for microwave access (WiMAX), 3G, 4G, CDMA, digital subscriber line (DSL), etc. Similarly, the networking protocols used on the network channel may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network channel may be represented using technologies and/or formats including the hypertext markup language (HTML) and the extensible markup language (XML). In addition, all or some of links may be encrypted using conventional encryption technologies such as secure sockets layer (SSL), transport layer security (TLS), and Internet Protocol security (IPsec).

The service server system 102 may provide a number of services 116 via internal modules. For example, the service server system 102 includes a locations module 118, a customers module 120, a payments module 122, an employees module 124, an inventory module 126, an orders module 128, or any combination thereof.

The service server system 102 may be implemented by a computer system with at least one processor and one non-transitory memory. The service server system 102 may be implemented by a computer system of FIG. 3.

The service server system 102 may be implemented by components, storages, and modules described below. The modules may be implemented as hardware components, software modules, or any combination thereof. For example, the modules described may be software modules implemented as instructions on a non-transitory memory capable of being executed by a processor or a controller on a machine described in FIG. 3.

Each of the modules may operate individually and independently of other modules. Some or all of the modules may be combined as one module. A single module may also be divided into sub-modules, each performing separate method step or method steps of the single module. The modules may share access to a memory space. One module may access data accessed by or transformed by another module. The modules may be considered "coupled" to one another if they share a physical connection or a virtual connection, directly or indirectly, allowing data accessed or modified from one module to be accessed in another module.

The service server system 102 may include additional, fewer, or different modules for various applications. Conventional components such as network interfaces, security functions, load balancers, failover servers, management and network operations consoles, and the like are not shown so as to not obscure the details of the system.

In the embodiment shown in FIG. 1, the locations module 118 may be configured to track location-based information of a merchant/business account. For example, the locations module 118 may track sales activity at each retail or virtual location of a merchant/business account. The sales activity may be recorded from the client API 106, where the client terminal 104 serves as a point-of-sale terminal. The sales activity may be presented on the web dashboard 112 via the dashboard API 114. The sales activity may be further processed via the back-end API 110.

The customers module 120 may be configured to track customer interactions with the merchant/business account. The customer interactions may be recorded from the client API 106 similar to the locations module 118. The customer interactions data may be consolidated with the sales activity in a database of the service server system 102. The customer interactions may be further processed via the back-end API 110.

The payments module 122 may be configured to track payment entries to the merchant/business account. Each payment may be processed by an application running on the client terminal 104. The payment information may be harmonized with the customer interactions and the sales activity in a database of the service server system 102. The payment entries may be further processed via the back-end API 110. The payments module 122 may support international sales transactions. For example, the payments module 122 may support international currency, international back-end processors via the back-end API 110, international payment certification process, or any combination thereof.

The employees module 124 may be configured to manage information regarding employees of the merchant/business account. For example, the employees module 124 may track sales activities associated with an employee of the merchant/business account. The employees module 124 may be used to manage conversion rates of sales representatives of the merchant/business. The employees module 124 may be coupled to a back-end sales management tool through the back-end API 110.

The inventory module 126 may be configured to track inventory of the merchant/business account. The inventory may be deducted based on sales activity received through the client API 106, where the client terminal 104 serves as the point-of-sale terminal. The inventory module 126 may be consolidated with the sales activity and the customer interactions, such as returns, in a database in the service server system 102.

The orders module 128 may be configured to track orders for products or services of the merchant/business account. The orders may be track through the sales activity received through the client API 106. The orders module 128 may consolidate with the sales activity and the customer interactions in a database of the service server system 102.

The client terminal 104 may connect with the service server system 102. The service server system 102 may provide an Android™-based client, which may be deployed stock, or customized by a partner. Alternate clients include other mobile devices, desktop devices, Web-based clients, or other servers.

The client terminal 104 may include a client operating system 130, a point-of-sale application 132, and a platform developer kit 134. The client operating system 130 may be an operating system of the client terminal 104, such as Android™ or iOS™. The point-of-sale (POS) application 132 may be modules executable on the client terminal 104 to perform point-of-sale services through the platform developer kit 134. The platform developer kit 134 may be a set of modules that are configured to communicate with the client API 106.

The point-of-sale application 132 may handle tolerance of network failure or server unavailability. In some embodiments, the POS application 132 may work completely offline and may synchronize with one or more cloud server systems 102 and/or back-end systems 108 or other clients 104 via an asynchronous queue. The POS application 132 may facilitate synchronization of reference data (e.g., inventory items, menus, employees, orders, etc.) between all devices (e.g., clients 104, cloud server systems 102, back-end system 108, etc.) associated with an account (e.g., merchant account). The POS applications 132 may provide support for encrypting credit card readers, receipt printers (e.g., mobile or fixed), support for all-in-one dedicated devices, and/or support for multiple accounts on a single client device 104. In such an embodiment, a merchant with two different businesses may use a single client device 104 and switch between the accounts.

Reference data synchronization may be the synchronization of reference data that ensures that all client devices 104 have the data they need to work in an offline mode and that any reference data that has been changed by one client is synchronized when the client device 104 comes back online. Examples of reference data that may be synchronized may include items (e.g., inventory items such as names, price, UPC code, modifiers, and/or layouts), orders (e.g., restaurant meal orders), employees (e.g., employee name, PIN, and/or role or permissions), and/or merchant location and location metadata (e.g., merchant name, location, address, tax rate, etc.). When there is a change to any reference data from one client device 104, all other client devices 104 may be notified through a push notification that some reference data was changed, which may trigger a synchronization. Synchronization conflicts may be handled in a last-one wins scenario, where the latest item updated would reflect the data change and that change would be propagated across the devices 104.

The POS application 132 may provide asynchronous queues to record transactions. For example, a worker may process dequeues transactions and transmit them to a server. If the server replies confirm receipt of the transactions, the client device 104 considers the transaction processed. Otherwise, the client 104 will attempt to continue to transmit until confirmation is received. In some embodiments, a merchant may have the option to queue the payment and take the risk of the transaction not authorizing. Merchants may also have the option to process payments asynchronously to speed up payments in high-throughput scenarios.

The platform developer kit 134 may include a client payments module 136, a client queue module 138, a hardware module 140, a client inventory module 142, a client orders module 144, a client customers module 146, or any combination thereof. The client payments module 136, the client inventory module 142, the client orders module 144, and the client customers module 146 may be configured to communicate with the payments module 122, the inventory module 126, the orders module 128, and the customers module 120 respectively. The client queue module 138 may be configured to manage the sales queue by the client terminal 104, such as a reliable asynchronous queue to record transactions as described herein. The hardware module 140 may be configured to modify the other modules for operation of the point-of-sale terminal based on the hardware specification of the client terminal 104.

The point-of-sale application 132 may include a timecards module 148, a self serve module 150, a register module 152, a store inventory module 154, or any combination thereof. The timecards module 148 may be configured to manage employees operation of the client terminal 104. For example, the timecards module 148 may track when an employee is operating the client terminal 104. The timecards module 148 may communicate via the platform developer kit 134 to the client API 106, and report the employee time cards information to the employees module 124.

The self serve module 150 may be configured to provide an interface for customers to use the client terminal 104 to checkout products or services for sale. For example, the self serve module 150 may include a bar code scanner functionality, a check-out functionality, a payment functionality, a browse product functionality, or any combination thereof.

The register module 152 may be configured to provide an interface for an operator of the merchant/business to facilitate sales transactions. The register module 152 may have the bar code scanner functionality, the check-out functionality, the payment functionality, or any combination thereof.

The store inventory module 154 may be configured to provide an interface to view the inventory of the business/merchant through the client inventory module 142 in the platform developer kit 134. The store inventory module 154 may be coupled to the self serve module 150 and the register module 152.

When the client terminal 104 is disconnected from the service server system 102, the client terminal 104 may still operate as a point-of-sale terminal. A merchant operator may add inventory of change price of inventory item via the client terminal 104 or the web dashboard 112. The service server system 102 may provide notification to the client terminal 104 once connection is made once again. This notification may be part of a synchronization process, where only changed items are sent. If multiple overwriting changes are made, the last update may be sent to the client terminal 104.

Offline transaction may occur based on a merchant's approval. After a predetermined period of time where the client terminal 104 cannot re-connect with the service server system 102, the merchant operator is prompted to submit the client terminal 104 into offline mode. Authorization to operate in the offline mode expires after a pre-determined period of time.

Transactions may be stored and queued in the offline mode. However, some processes are disabled in the offline mode. In some embodiments, refunds cannot be queued in offline mode.

The back-end system 108 may include a pay processor module 156, plugin modules 158, an offers module 160, a reservation module 162, a loyalty module 164, and/or an information module 166. The modules of the back-end system 108 may be independent third-party systems that may be coupled to the service server system 102. The pay processor module 156 may process payments of each sales activity. The back-end API 110 may send the sales information to the pay processor module 156, and the pay processor module 156 may process the payment and confirm with the service server system 102. For example, the pay processor module 156 may be based on modules, devices and/or services provided by, for instance, First Data™, Global™, Vantiv™, or Heartland™. The plugin modules 158 may include uncategorized modules that may plug into the service server system 102. For example, the plugin modules 158 may include a menu service of providing menus to customers, an analytics service of performing sales analysis and financial analysis for the merchant/business account.

The offers module 160 may include a pipeline of special offers that may be recognized by the service server system 102 and shared with the client terminal 104. For example, the special offers may come from, for instance, Groupon™, LivingSocial™, Scoutmob™, Google™, or Amazon™. The reservation module 162 may include a reservation service for customers to reserve a product or service of the merchant/business account prior to a sales transaction. The reservation module 162 may work with the inventory module 126 to facilitate the reservation. The reservation module 162 may also provide an interface to the client terminal 104 to make the reservations. For example, the reservation module 162 may be based on, for instance, OpenTable™, Yelp™, GrubHub™, or OrderAhead™.

The loyalty module 164 may include a loyalty reward service that may be recognized by the service server system 102 and shared with the client terminal 104. For example, the loyalty reward service may be provided by the merchant account by, for instance, iDine™, SkyMiles Dining™, Belly™, RewardMe™, or PunchTab™. The information module 166 may provide merchant-related information to the service server system 102 and/or to the client terminal 104. For example, the merchant-related information may include reviews, comments, general merchant information, product/service information, or any combination thereof. For example, the information module 166 may be a module based on a merchant website, for instance, Yelp™, Facebook™, or Google™.

The techniques introduced in the modules herein may be implemented by programmable circuitry programmed or configured by software and/or firmware, or they may be implemented by entirely by special-purpose "hardwired" circuitry, or in a combination of such forms. Such special-purpose circuitry (if any) may be in the form of, for example, one or more application-specific integrated circuits (ASICs), programmable logic devices (PLDs), field-programmable gate arrays (FPGAs), etc.

Further discussed below are features and aspects of the POS platform system 100 according to certain embodiments of the disclosure.

Database is Multi-Tenant

The POS platform may be a multi-tenant system that allows separation of merchants within the same system. This design principle may allow the system to split off merchants or merchant groups.

No Credit Card Storage

By not accepting or storing credit card or PAN data, the service may reduce business risk associated with the storage and loss of credit card data.

Monitoring

The POS platform may include monitoring coverage in terms of custom-built process and log file monitoring, system performance monitoring via Ganglia, and external transaction monitoring via Pingdom. Alerts may be sent by email to a distribution group and to individuals. The POS platform may include alerting via SMS and other distribution methods to avoid dependence on email alerts.

Centralized Logging

Application and server logs may be shipped to a centralized logging server that performs file level monitoring and checks. Centralized logging servers may be useful for monitoring, file integrity checking, and troubleshooting. Appropriate logging is built into the applications. Centralized logging may also help performance of impact analysis to alert customers when their service has been impacted.

Point in Time Recovery

The database may be replicated both to a slave and to a standby server that is offset in time by several hours. This may allow the POS platform to restore from a point in time in the event that a database corruption occurs.

Rollback and Merchant Level Wire On/Wire Off Capabilities

The POS platform may include a build and release method of the development kit for the client terminal devices. Old versions of the development kit and the APIs of the service server system may be maintained on the servers, so rollback to a previous version would be very fast in the event of a serious bug or software flaw. The process to build and release code may be automated and safe by shipping and restarted servers one at a time.

The POS platform may also include a method via database table to wire on new features. This capability may allow the POS platform to trial new features with limited customers and with limited impact (i.e. A form of AB testing). It may also provide a relatively simple capability to monetize new features or have advanced product feature packages available to premium customers.

Security and Change Tracking

The service server system may include a module for file checking configured to enable all changes to be tracked and made visible so that any change may be reviewed by management. Software packages may be signed by a limited set of users.

Data/Pooling Architecture

The database for customer information and business transactions may use multiple masters to avoid a monolithic architecture. The database may account for the notion of a top tier "Enterprise" or similar master ID that may tie merchant IDs together. The database may still support multi-tenants allowing separation of merchant groups into separate instances. This may enable splitting of the service by merchant—e.g. The POS platform may create N merchant instances and thereby isolated changes and problems to 1/Nth of all customers to ensure all customers are not impacted in the event of a change or a problem.

The POS platform may include a uniform resource identifier (URI) or similar construct to allow segmenting of its server pools into pods that may appropriately route requests to the right merchant pools and databases. This may reduce the need to create a lookup service in the future to identify what swimlane or "pod" any merchant might be in. Groups of merchants may be collected and associated together within a pod under the to-be-implemented enterprise construct.

Load Balancer

The service server system may include a software (HA Proxy) load balancer in its web tier. However, the service server system may also include a hardware load balancer, a specific device designed specifically for that purpose. This may increase availability and decrease overall cost and complexity.

Static Content into Single or Separate Domains

Static content in the POS platform may be stored in a single domain or on separate domains. When the static content is stored on separate domains, the contents may be cached and served more efficiently to customers.

Third Party Service Calls

Calls between the client terminal device and the service server system may be made asynchronously. Calls from the service server system to the backend system third party servers may be made synchronously. However, the POS platform may split off the third party calling service, where authorization failures will not impact other services running on the application server tier.

Implement a CDN

The client API and the dashboard API may transfer contents in html and javascript and utilize a CDN to cache those static contents to the client devices and dashboard hosts. The use of CDN may reduce workload of the application and database servers in the service server system.

Use of Database Slave

In some embodiments, the POS platform uses MySQL replication to create a database slave. The slave may be used for backup and data recovery purposes. The POS platform may move read operations such as lookups and reporting to the slave to reduce load on the read/write to the master database.

Cloud Services for DR

The POS platform may replicate its services for disaster recovery (DR) purposes in a low cost model by using a cloud hosting service. By implementing DR in the cloud, the POS platform will be able to diversify its hosting services to prevent a platform-wide failure.

Customer Support Processes

The POS platform may include a communication system for allowing customers to interact with the POS platform and for merchant operators to communicate with customers.

Field Encryption of Customer Data

The POS platform may have the capability of encrypting data in its database at a field level. Customer data may be encrypted at the field level to reduce risk of customer data theft. The POS platform may also include security scans and operational controls to further improve security. A firewall mechanism may be added to prevent access to customer data.

International/Localization Capabilities

For the client application, string resource bundles may be included to handle translations. At the server level, a string resource bundle may also be included to support translations for system messages on the fly. Mechanisms to handle currency factualization may be included in the payment modules.

Business Metrics Monitoring

The POS platform may include a real-time or near real-time monitoring of business metrics and to graph them over time. For example, the POS platform could query logs or the database and API transactions or authorizations per minute and display those graphically on a merchant dashboard provided by the dashboard API. Such graphs may help determine the level of impact during an event.

Figure 2:
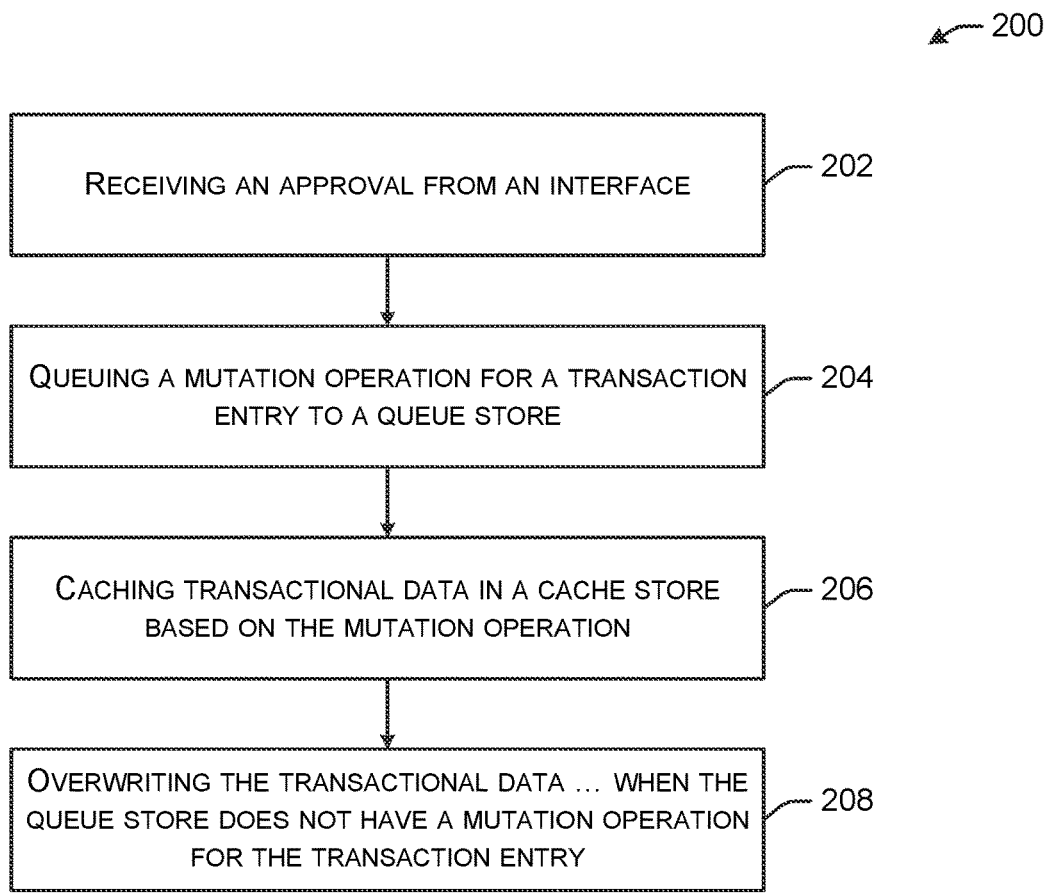
FIG. 2 is a flow chart of an example method of operating a point of sale (POS) platform system in an offline transaction mode in accordance with one or more embodiments of the disclosure.

Referring now to FIG. 2, therein is shown a flow chart of a method 200 of operating a point of sale (POS) platform system in an offline transaction mode according to certain embodiments of the disclosure. The method 200 may include: an operation 202 of receiving an approval from an interface of a client device to change the client device to the offline transaction mode when a service connection is disconnected; an operation 204 of queuing a mutation operation for a transaction entry to a queue store, the transaction entry including payments, orders, customers, or employees; an operation 206 of caching transactional data in a cache store based on the mutation operation; and an operation 208 of overwriting the transactional data for the transaction entry in the cache store by synchronizing with a service server system after the service connection is re-established when the queue store does not have a mutation operation for the transaction entry queued.

Figure 3:
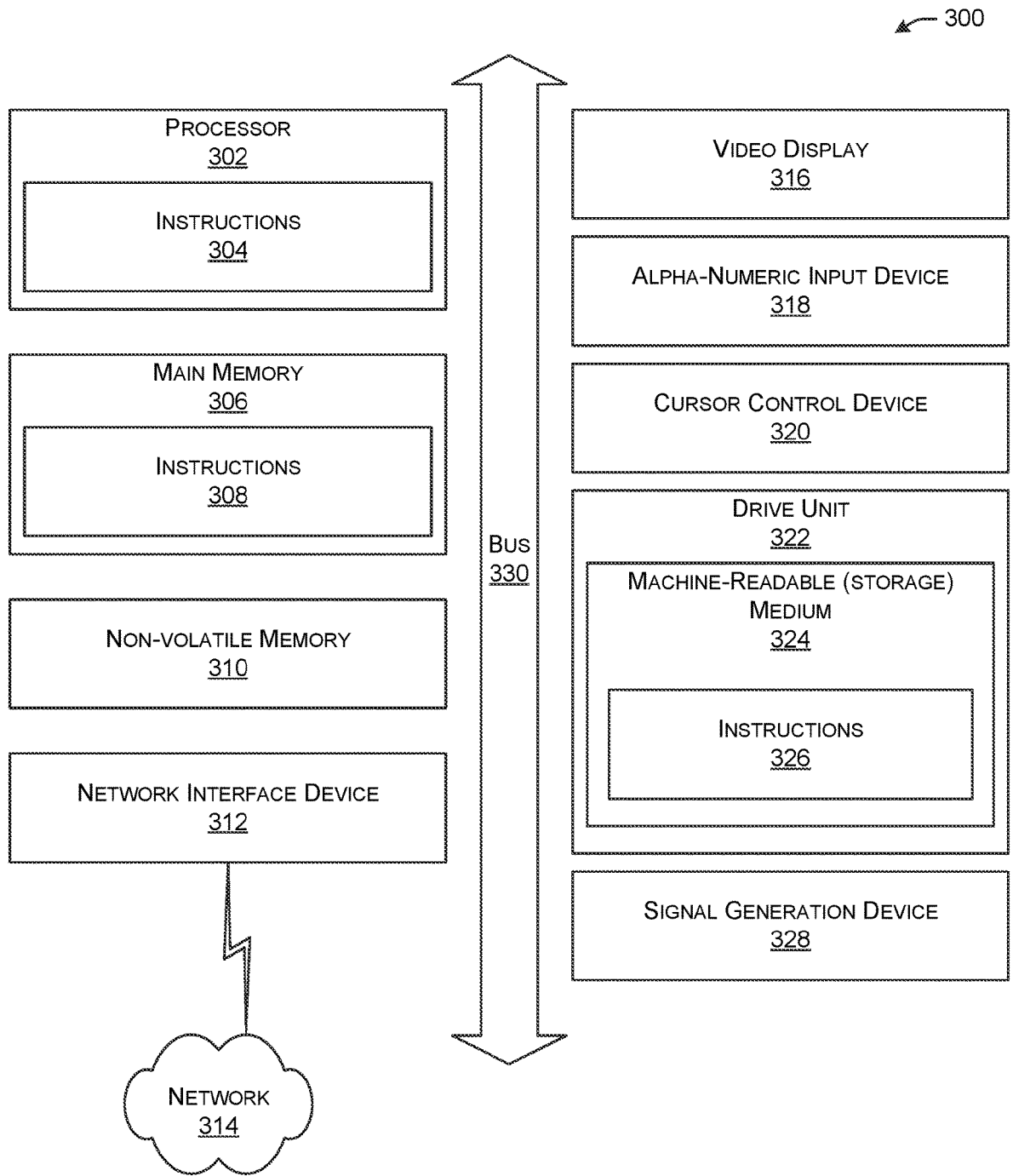
FIG. 3 is a diagrammatic representation of a machine in the example form of a computer system within which a set of instructions, for causing the machine to perform any one or more of the methodologies or modules discussed herein, may be executed, in accordance with one or more embodiments of the disclosure.

Referring now to FIG. 3, therein is shown a diagrammatic representation of a machine in the example form of a computer system 300 within which a set of instructions, for causing the machine to perform any one or more of the methodologies or modules discussed herein, may be executed, according to certain embodiments of the disclosure.

In the example of FIG. 3, the computer system 300 may include a processor 302, memory 306, non-volatile memory 310, and an interface device 312. Various common components (e.g., cache memory) are omitted for illustrative simplicity. The computer system 300 is intended to illustrate an example hardware device on which any of the components depicted in the example of FIGS. 1-3 (and any other components described in this specification) may be implemented. The computer system 300 may be of any applicable known or convenient type. The components of the computer system 300 may be coupled together via a bus 330 or through some other known or convenient device.

This disclosure contemplates the computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable computer device, a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

The processor 302 may be, for example, a conventional microprocessor such as an Intel™ Pentium™ microprocessor or Motorola™ Power PC™ microprocessor. One of skill in the relevant art may recognize that the terms "machine-readable (storage) medium" or "computer-readable (storage) medium" include any type of device that is accessible by the processor. The processor may include instructions 304.

The memory 306 may be coupled to the processor 302 by, for example, a bus 330. The memory 306 may include, by way of example but not limitation, random access memory (RAM), such as dynamic RAM (DRAM) and static RAM (SRAM). The memory 306 may be local, remote, or distributed. The memory may include instructions 308.

The bus 330 may also couple the processor 302 to the non-volatile memory 310 and drive unit 322. The non-volatile memory 310 may often be a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data may often be written, by a direct memory access process, into memory during execution of software in the computer 300. The non-volatile storage may be local, remote, or distributed. The non-volatile memory 310 is optional because systems may be created with all applicable data available in memory. A typical computer system may usually include at least a processor 302, memory 306, and a device (e.g., a bus 330) coupling the memory 306 to the processor 302.

Software may typically be stored in the non-volatile memory 310 and/or the drive unit 322. The drive unit 322 may include machine-readable (storage) medium 324. The machine-readable (storage) medium may include instructions 326. Indeed, for large programs, it may not even be possible to store the entire program in the memory 306. Nevertheless, it should be understood that for software to run, if necessary, it is moved to a computer readable location appropriate for processing, and for illustrative purposes, that location is referred to as the memory 306 in this paper. Even when software is moved to the memory for execution, the processor 302 may typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor 302 is considered to be "configured to execute a program" when at least one value associated with the program is stored in a register readable by the processor 302.

The bus 330 may also couple the processor 302 to the network interface device 312 to communicate via one or more networks 314. The interface 312 may include one or more of a modem or network interface. It will be appreciated that a modem or network interface may be considered to be part of the computer system 300. The interface may include an analog modem, isdn modem, cable modem, token ring interface, satellite transmission interface (e.g. "direct PC"), or other interfaces for coupling a computer system to other computer systems. The interface may include one or more input and/or output devices (e.g., video display 316, alphanumeric input device 318, cursor control device 320, etc.). The I/O devices may include, by way of example but not limitation, a keyboard, a mouse or other pointing device, a gesture control and/or detection device, an eye movement control and/or detection device, disk drives, printers, a scanner, and other input and/or output devices, including a display device 316. The display device 316 may include, by way of example but not limitation, a cathode ray tube (CRT), liquid crystal display (LCD), or some other applicable known or convenient display device. For simplicity, it is assumed that controllers of any devices not depicted in the example of FIG. 3 reside in the interface.

In operation, the computer system 300 may be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system may typically be stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated (e.g., by signal generation device 328). It has proven convenient at times, principally for reasons of common usage, to refer to these signals as bits, values, elements, symbols, characters, terms, numbers, or the like.

Figure 4B:
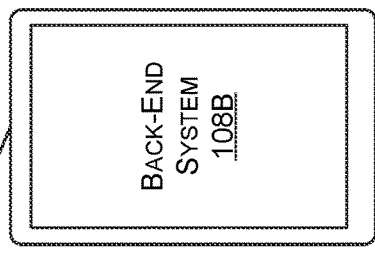
FIG. 4B is a diagrammatic representation of an example architecture of a database tier of the service server system in accordance with one or more embodiments of the disclosure.
Figure 4B:
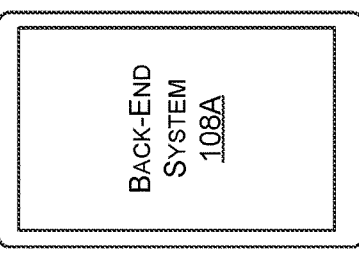
Figure 4B:
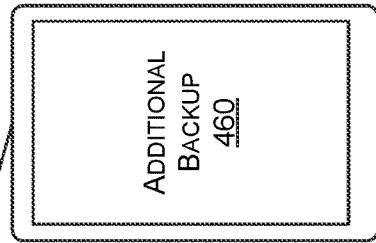

FIG. 4A is a diagrammatic representation of an example architecture 400 of a service application tier of the service server system in accordance with one or more embodiments of the disclosure. In some embodiments, one or more clients 104 may transmit data via one or more networks 314 to one or more cloud server systems 102. The client API 106A-106B may be externally accessible and be associated with a data access layer (DAL), which may be a layer of an application, which may provide simplified access to data stored in persistent storage. In some embodiment, the DAL may be associated with a cloud computing provider, for example, in a datacenter. The back-end API 110A-110B may be only accessible internally to the system. In some embodiments, the back-end APIs 110A-110B may permit outbound API calls. The back-end APIs 110A-110B may transmit information to the database tier, depicted in FIG. 4B. Additionally, the back-end APIs 110A-110B may communicate with a central logging and backup server 405. The central logging and backup server 405 may monitor and/or maintain operational control over all application and database tier logs of the cloud server system 102. Rules may apply against the logs for alerts that may need to be sent (e.g., via email, text message, etc.). For example, if certain patterns are identified in the log or based on the frequency of events found in the logs. The central logging and backup server 405 may monitor processes on all client devices 104, monitor resources (e.g., memory monitoring, CPU usage, etc.), monitor servlets hit, monitor against each front end, security monitoring, and the like.

FIG. 4B is a diagrammatic representation of an example architecture 450 of a database tier of the service server system in accordance with one or more embodiments of the disclosure. The back-end system 108A-108B may receive data from one or more cloud server systems 102, (e.g., from FIG. 4A). The back-end system 108A-108B may process the data and may communicate with the one or more clients 104 via the cloud server system 102. In some embodiments, the one or more back-end systems 108A-108B may communicate with one or more additional backup servers 460.

In some embodiments, the cloud server system 102 may facilitate passive customer database creation from credit cards. For example, when a credit card is used for payment, the system may determine whether a customer record exists. If not, then one is created and associated with the credit card. At the end of the transaction, the customer may provide contact information to be associated with the record, such as an email address or phone number.

In some embodiments, the client devices 104 may be able to discover other client devices 104 on a network, such as a LAN. The client device 104 can communicate with other devices for auto-configuration of shared resources and/or coordination of order numbers. In some embodiments, the client devices 104 may use a zeroconf multicast DNS discovery protocol to advertise their existence. Once the discovery is made, a client device 104 may request from another a list of configured shared resources, such as kitchen printers, kitchen display systems, etc. In some embodiments, it may be desirable to have a single set of increasing order numbers. Client devices 104 may auto discover other devices connected to the same network that are servicing the same merchant and coordinate order numbers. Client devices 104 may broadcast to other devices 104 that they are taking or utilizing an order number. In some embodiments, they may wait for a predetermined amount of time for a response to be broadcast. If no responses are received from other client devices 104, the number may be successfully taken. Client devices 104 that receive the message may process the message may determining if the number exceeds their recorded last taken order number. If so, the last-taken order number may be updated. If the number is below the last-taken, the client device 104 may broadcast a reset to their last-taken+1. If a client device 104 receives a rest, the client device may set the last-taken order number to the number prescribed in the reset message.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a smartphone, a wearable computer device, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

In some embodiments, the POS platform may be an open platform, wherein the open platform may provide hooks into the system to allow third party developers to develop their own applications to augment or provide further functionality to the system. For example, data may be pulled from the system and data may be pushed into the system. This may enable third party developers to develop applications that may run concurrently with the system and augment system functionality.

In some embodiments, the POS platform may provide the ability to run a portion of the system in an offline mode. In some embodiments, systems may execute from a remote server and store and/or modify data in the remote server or remote databases, permitting multiple devices to communicate with the system and access data. In one embodiment, the POS platform may execute an application on multiple devices. In some embodiments, the device may be a point of sale (POS) device that has access to inventory data stored in the cloud. In some embodiments, the application may synchronize with the data available in the cloud via a network connection. If the device is unable to communicate with the cloud-based information or system, a network queuing system may enable the device to continue functioning without the network connection. For example, the POS device may generate a transaction for the purchase of a service or merchandise and obtain payment information from a swipe of a credit or debit card. The POS device may store the information locally in a queue until a network connection is available. Once connected back to the network, the POS device may be able to synchronize the data with the cloud using the network queuing system. This may enable users of the POS device to create the orders and obtain payment information and queue the orders and payments until synchronization with the cloud is possible. During the synchronization process, information in the cloud may be altered or modified based on the transaction information received from the POS device. For example, the order information may indicate a customer purchased multiple items. The information may be used to update the inventory information that may be stored in the cloud. Additionally, payment information associated with the transaction may be processed.

In some embodiments, certain embodiments of the systems and methods described herein may enable automatic detection of devices associated with the system when they are available for communication via one or more networks. This may enable the system to facilitate communication of the devices with the system and each other. Additionally, each of the devices may communicate with one or more cloud services and/or remote databases via one or more networks.

In some embodiments, if the devices are unable to connect to a network, then they may be able to operate in an offline local network mode, where the POS devices are able to communicate via peer-to-peer protocols. While the POS devices operating in the offline mode, the orders may be transmitted from the POS device of the waitress to the POS device in the kitchen. Additionally, the POS device of the waitress may also queue the orders and their respective payment information locally until the POS device is able to connect to the cloud service. Once the POS device is able to communicate with the cloud service, the POS device may transmit the queued orders and their respective payment information to the cloud for processing (e.g., inventory updates, payment processing, etc.).

For example, a business may utilize multiple devices that may be connected to a network of the business. The system may be able to determine when the devices are available on the network and how the devices will communicate with each other.

Furthering the example, the business may be a restaurant. Multiple devices may be utilized by waitresses to take food orders from customers. Additionally, at least one device in communication with the devices utilized by the waitresses may be utilized by the kitchen to receive the food orders from the waitresses. The orders generated by the waitresses using the devices may then be transmitted over a network to a remote server, which then transmits the order to the device in the kitchen for fulfillment of the food order.

A customer may request to order a hamburger. A waitress may use a POS device to create an order. The POS device may generate an order identifier and associate it with the order. The hamburger may be inserted into the order as a line item. The line item for the hamburger may have an identifier associated with it. The order may be stored on the POS device (e.g., in a local database). The order may then be put into a local queue on the POS device. The order may be stored in a data object and the data object may be stored to the local queue.

In some embodiments, the waitress may then obtain payment information from the client, such as by swiping a credit card. The credit card information may be encrypted and stored in an object associated with the order. In some embodiments, the waitress may select a tender type (e.g., credit card, debit card, gift card, payment device, etc.). The payment information may be stored to a data object and the data object may then be placed into the queue as the next item after the corresponding order.

When the POS device is online, the items may be stored in the queue for a short period of time. The POS device may transmit the items in the queue to the remote server over the network. If the POS device is not able to communicate with the remote server, the order items may be stored in the queue until a connection to the server is able to be established.

Once the POS device is able to communicate with the server, items in the queue may be transmitted to the queue for processing. Processing may include adding the items to remote databases, processing payments, and communicating items back to one or more POS devices for further processing. For example, if there are multiple POS devices being utilized by waitresses, and each of the waitresses are creating and transmitting orders to the server, the server may aggregate the orders, which may be based on time of receipt of orders, and transmit the aggregated orders to the POS device in the kitchen for fulfillment of the orders.

In some embodiments, if the POS device is not able to communicate with the remote server, a peer-to-peer network may be established for the POS devices associated with the merchant, in order to facilitate the exchange of information among the POS devices.

In some embodiments, the server may include a queue to receive items from the one or more POS devices of a merchant. The server may process items as they are being received in the queue. Multiple databases may be updated based on items in an order. For example, the hamburger line item in the above example may be decremented from an inventory database, may be added to a sales database, and the like. The update to the different databases may trigger a synchronization across all the POS devices. This may enable the merchant to have the most accurate information when interacting with a customer. For example, if the hamburger is ordered, and it is the last hamburger available in the restaurant, the POS devices may be updated so that waitresses will be aware that they may no longer take orders for hamburgers.

In some embodiments, a user of the POS device may be able to view items that are currently in the queue on the POS device. In some embodiments, the POS device may also provide functionality to view the queue associated with the server.

Pushing Information

In some embodiments, the system may enable notifications to be pushed to devices based on updates to information (e.g., inventory updates). For example, a new item may need to be added to the inventory of a merchant. A user may add the information from a POS device by creating an entry for the item and including associated data, such as quantity, price, identifier, etc. The entry for the item may be submitted to the server, where the information is added to a database. The update may then trigger a process to generate a notification and transmitting the notification to all POS devices associated with the merchant. In some embodiments, the notification may indicate that a new item has been updated and that the POS device should synchronize with the server. In some embodiments, the update to the server may trigger a process to update each of the devices associated with the merchant.

In some embodiments, the system may enable the server to pull information from the associated POS devices. For example, the server may be in communication with each of the POS devices associated with the merchant to ensure constant data synchronization across all devices associated with the merchant to ensure that each of the POS devices has the correct information available to them.

The system may enable data synchronization across POS devices even if the devices are in offline mode by enabling a peer-to-peer network that is only available to POS devices associated with a particular merchant. The peer-to-peer network may enable information to be pushed locally across the local network to update the POS devices. In some embodiments, once the POS devices are able to connect to a network, the information may then be synchronized with the remote server. In some embodiments, the synchronization may be based at least in part on the unique identifiers associated with each entry and/or item. During synchronization, the server may identify any duplicate entries and/or items and remove them from the system. In some embodiments, if there are duplicate entries, the server may keep one entry based at least in part on a date or timestamp associated with the entry and remove the others.

Remote Logging and Monitoring

In some embodiments, POS devices may include customized hardware such as firmware storage and non-volatile memory associated with the system. In some embodiments, the POS devices may store information that is not pushed to a remote server or into the cloud (e.g., history of user actions, which may include clicking on buttons, the number of clicks, and the like). In some embodiments, a log file of all actions associated with the client application may be generated and stored. In some embodiments, the information may be used for remote monitoring (e.g., remote trouble shooting of a POS device).

The customized hardware may enable the system to detect periods of time when merchants are not busy and dynamically update the software of the client devices. Similarly, the customized hardware may be able to detect certain types of activity and trigger actions based on the detection. For example, the client devices may detect the number of pages a printer is printing and automatically order paper, printer toner, or the like based on the detection.

In some embodiments, the customized hardware may enable the system to determine whether the POS devices are connected to a network. The customized hardware may enable administrators of the system to remotely access the POS device to help troubleshoot problems, such as network connectivity issues. In some embodiments, an administrator may take control of the operating system of the POS device and view all the data stored on the device, not just the data specific to the client application. The administrator may then communicate with the consumer (e.g., merchant or employees of the merchant) by phone to troubleshoot any issues or take control of the device remotely and take actions to identify and resolve technical issues.

Multiple Applications on a POS Device

In some embodiments, multiple applications may be executed on the POS devices. The applications may be in communication with each other to share credentials and information. For example, one application that may execute on a POS device is a register application. A second application that may execute on the POS device may be an inventory application. Once a user signs into the register application, the register application and inventory application may communicate with each other to pass authentication credentials so the user only has to sign into the system once. The register application may communicate with the inventory application to obtain information regarding the status of certain items in inventory. The different applications may be provided by the system or may be developed by third parties. In some embodiments, applications may have the ability to automatically discover each other and authenticate and interact with each other.

App Store

In some embodiments, the system may include an application marketplace or store ("app store") which may be a digital distribution platform specifically for POS applications. POS applications may be acquired from the app store for a one-time payment or a periodic subscription (e.g., monthly fee). In some embodiments, the POS applications may be acquired for a percentage of merchant sales. For example, the fee associated for acquiring a POS application may be a percentage of the total dollar value of an order that a customer from a review website submits into the POS system for the specific merchant. In some embodiments, a fee may be associated with each reservation or transaction.

In some embodiments, instead of billing the merchant for the POS application, the merchant may be paid for using the POS application. For example, a merchant may be enabled to select a third party who is willing to pay the merchant in order to pass data and incentives to the customers of the merchant via receipts or other communication methods. Thus, a merchant using the POS application may generate revenue from third parties for access to their client base.

Local Backup

In some embodiments, the POS device may include an archiving mechanism. In some embodiments, the archiving mechanism may be a SQL light database that may mirror one or more server databases with a preset amount of information. For example, in a restaurant, the server databases may store 10,000 orders. However, the devices may store the most recent 500 orders.

Catalog with Rights Management

In some embodiments, the POS platform may enable a manufacturer, merchant or third party to create a catalog, which may include a listing of items, prices associated with the item, item identifiers, title or name of time, SKU associated with the items, images of the item, description of the item, costs associated with the item, and the like. The catalog may have permissions settings associated with it to enable sharing of the catalog with other merchants or third parties via the POS platform. In some examples, a manufacturer of audio equipment may create a catalog that may then be used by an audio merchant as the basis of their inventory system, rather than having the merchant re-enter the information manually. The catalog may be used for sales in local stock, inventory, ordering (e.g., to replenish inventory or on behalf of the customer). In some embodiments, the catalog may be accessed by one or more POS devices of a merchant. The POS devices may generate reports, track inventory, order or re-order items, and the like based at least in part on the catalog of items.

Payment Type Loyalty Program

In some embodiments, the POS platform may provide the ability for a merchant and/or consumer to earn rewards for the use of specific payment types. For instance, if a merchant promotes the X Bank Card, and the customer uses that card as their payment type, the customer and merchant may earn points (either fixed or in proportion to the amount spent at that merchant). The points may be redeemed via the POS platform during one or more purchase transactions that may be processed by the POS devices. The points may be associated with consumers via user profiles associated with consumers. The user profiles may be generated using information based at least in part on information received from the consumer. The user profiles may be stored in a remote database. The generated points or other loyalty-based incentives may be associated with the user profile and stored in association with the user profile. The POS devices may retrieve user profile information associated with the consumer, including information associated with the loyalty program and may process transactions based at least in part on available loyalty program points. In some embodiments, the POS devices may retrieve a history of loyalty program points that have been earned, redeemed, expired, or the like.

Automatic Pairing of Devices

In some embodiments, the POS platform may provide the ability for peripheral devices, such as printers, scales, scanners, cameras, recorders, and other devices to be automatically detected and connected to a POS device associated with the POS platform. The peripheral devices may automatically be detected by the POS devices. In some embodiments, the peripheral devices may generate and transmit signals that may be detected by the POS devices. In some embodiments, the signals may be transmitted one or more networks (e.g., wired or wireless), such as Ethernet, Bluetooth, WiFi or the like. In some embodiments, the peripheral devices may be either manually or automatically added to the POS devices available in the POS platform. In some embodiments, upon detection of a peripheral device, the POS device may obtain, via one or more networks, drivers of the peripheral devices. In some embodiments, the drivers may be automatically installed on the POS devices upon the automatic association of peripheral devices with one or more POS devices.

In one embodiment, a point of sale (POS) platform system may include a cloud-based POS service system including a client program interface, a web service interface, and a back-end service interface; a client device connected to the cloud-based POS service system via the client program interface, the client device including a POS application coupled to a software development kit configured to operate a functionality of the cloud-based POS service system through the client program interface; a web dashboard coupled to the cloud-based POS service system via the web service interface; and a back-end system coupled to the cloud-based POS service system via the back-end service interface.

In one aspect of an embodiment, the client device and the POS application may operate in an offline mode, while not connected to the cloud-based POS service system.

In one embodiment, a method of operating a point of sale (POS) platform system may include configuring a cloud-based POS service system with a client program interface, a web service interface, and a back-end service interface; receiving a sales order from a client device connected to the cloud-based POS service system via the client program interface, the client device including a POS application coupled to a software development kit configured to operate a functionality of the cloud-based POS service system through the client program interface; sending the sales order to a back-end system coupled to the cloud-based POS service system via the back-end service interface; receiving a customer-directed result from the back-end system based on the sales order sent; and providing a web dashboard including the customer-directed result to be displayed on a browser of a remote device via the web service interface.

In one embodiment, a method of operating a point of sale (POS) platform system in an offline transaction mode may include receiving an approval from an interface of a client device to change the client device to the offline transaction mode when a service connection is disconnected; queuing a mutation operation for a transaction entry to a queue store, the transaction entry including payments, orders, customers, or employees; caching transactional data in a cache store based on the mutation operation; and overwriting the transactional data for the transaction entry in the cache store by synchronizing with a service server system after the service connection is re-established when the queue store does not have a mutation operation for the transaction entry queued.

In another embodiment, a computer-implemented method may be provided. The method may include receiving, by a point of sale (POS) device comprising one or more processors, information associated with an order and payment information associated with the order; generating, by the POS device, a first object based at least in part on the information associated with the order and a second object based at least in part on the payment information; storing, by the POS device, the first object and the second object in a queue; and transmitting, by the POS device, the first object and the second object to a remote server.

In one aspect of an embodiment, transmitting the first object and the second object to the remote server may include determining, by the one or more processors, if a connection to the remote server is available.

In one aspect of an embodiment, the method may further include, in response to determining the connection to the remote server is available, transmitting, by the POS device, the first object and the second object to the remote server.

In one aspect of an embodiment, the method may further include, in response to determining the connection to the remote server is not available, establishing, by the POS device, a peer-to-peer connection with at least a second POS device.

In one aspect of an embodiment, the method may include receiving, by the POS device from the remote server, a notification indicating the remote server has modified remotely stored data and that the POS device needs to be synchronized with the remotely stored data.

In one aspect of an embodiment, the method may include obtaining, by the POS device, a POS application from a POS application marketplace.

In another embodiment, a computer-implemented method may include receiving, by a point of sale (POS) synchronization system comprising one or more computers, one or more objects from a plurality of POS devices, wherein the one or more objects are stored in a local queue; processing, by the POS synchronizations system, the local queue, wherein processing the local queue comprises modifying remotely stored data based at least in part on the one or more objects stored in the local queue; transmitting, by the POS synchronization system, a notification to each of the plurality of POS devices indicating that each of the plurality of devices needs to be synchronized with the remotely stored data.

In one aspect of an embodiment, the POS synchronization system may be an open platform.

In one aspect of an embodiment, the method may further include determining, by the POS synchronization system, a time period when the activity of the plurality of POS devices is low; and transmitting, by the POS synchronization system, an update to the plurality of POS devices.

In one aspect of an embodiment, the method may include transmitting, by the POS synchronization system, the one or more objects stored in the local queue to a POS device for additional processing.

In one aspect of an embodiment, the method may include accessing, by the POS synchronization system, a POS device to troubleshoot one or more issues.

In another embodiment, a point of sale (POS) device may include at least one memory storing computer-executable instructions; and at least one processor, wherein the at least one processor is configured to access the at least one memory and to execute the computer-executable instructions to receive information associated with an order and payment information associated with the order; generate a first object based at least in part on the information associated with the order and a second object based at least in part on the payment information; store the first object and the second object in a queue; and transmit the first object and the second object to a remote server.

In one aspect of an embodiment, the at least one processor may be further configured to execute the computer-executable instructions to determine if a connection to the remote server is available.

In one aspect of an embodiment, the at least one processor is further configured to execute the computer-executable instructions to, in response to a determination that the connection to the remote server is available, transmit the first object and the second object to the remote server.

In one aspect of an embodiment, the at least one processor is further configured to execute the computer-executable instructions to, in response to a determination that the connection to the remote server is not available, establishing, by the POS device, a peer-to-peer connection with at least a second POS device.

In one aspect of an embodiment, the at least one processor is further configured to execute the computer-executable instructions to receive, from the remote server, a notification indicating the remote server has modified remotely stored data and that the POS device needs to be synchronized with the remotely stored data.

In one aspect of an embodiment, the at least one processor is further configured to execute the computer-executable instructions to obtain a POS application from a POS application marketplace.

In another embodiment, a point of sale (POS) synchronization system may include at least one memory storing computer-executable instructions; and at least one processor, wherein the at least one processor is configured to access the at least one memory and to execute the computer-executable instructions to receive one or more objects from a plurality of POS devices, wherein the one or more objects are stored in a local queue; process the local queue, wherein processing the local queue comprises modifying remotely stored data based at least in part on the one or more objects stored in the local queue; transmit a notification to each of the plurality of POS devices indicating that each of the plurality of devices needs to be synchronized with the remotely stored data.

In one aspect of an embodiment, the POS synchronization system may be an open platform.

In one aspect of an embodiment, the at least one processor is further configured to execute the computer-executable instructions to determine a time period when the activity of the plurality of POS devices is low; and transmit an update to the plurality of POS devices.

In one aspect of an embodiment, the at least one processor is further configured to execute the computer-executable instructions to transmit the one or more objects stored in the local queue to a POS device for additional processing.

In one aspect of an embodiment, the at least one processor is further configured to execute the computer-executable instructions to access a POS device to troubleshoot one or more issues.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art may appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure may be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements may be physical, logical, or any combination thereof Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. In addition, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein may be applied to other systems, not necessarily the system described above. The elements and acts of the various embodiments described above may be combined to provide further embodiments.

Any patents and applications and other references noted above, including any that may be listed in accompanying filing papers, are incorporated herein by reference. Aspects of the disclosure may be modified, if necessary, to employ the systems, functions, and concepts of the various references described above to provide yet further embodiments of the disclosure.

These and other changes may be made to the disclosure in light of the above Detailed Description. While the above description describes certain embodiments of the disclosure, and describes the best mode contemplated, no matter how detailed the above appears in text, the teachings may be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element may be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which may be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A point-of-sale (POS) device comprising:
   at least one memory configured to store computer-executable instructions; and
   at least one processor configured to execute the computer-executable instructions to:
      determine that the POS device and one or more other POS devices are disconnected from a server, wherein the POS device communicates with the one or more other POS devices via the server when the POS device and the one or more other POS devices are connected to the server;
      upon determining that the POS device and the one or more other POS devices are disconnected from the server, add a first transaction order from a first customer to a transaction queue in the POS device;
      transmit, through a peer-to-peer network that connects the POS device to the one or more other POS devices, the transaction queue from the POS device to the one or more other POS devices, wherein the peer-to-peer network enables communication between the POS device and the one or more other POS devices when the POS device and the one or more other POS devices are disconnected from the server;
      receive, from one of the one or more other POS devices, a second transaction order including an identifier associated with an order item of the second transaction order;
      determine whether the identifier is already included in the transaction queue;
      upon determination that the identifier is already included in the transaction queue, remove the order item from the second transaction order;
      determine that the POS device is reconnected to the server; and
      upon the POS device reconnecting to the server, transmit the transaction queue from the POS device to the server.

2. The POS device of claim 1, wherein the at least one processor further executes computer-executable instructions to aggregate additional transaction orders to update the transaction queue in the POS device based on a time of receipt of the additional transaction orders.

3. The POS device of claim 1, wherein the at least one processor further executes computer-executable instructions to:
   upon the POS device reconnecting to the server, receive, from the server, a notification that the POS device needs to synchronize with the server; and
   synchronize POS device data stored in the at least one memory with server data stored in the server.

4. The POS device of claim 3, wherein the server data and the POS device data comprise inventory data, employee information, or merchant location metadata.

5. The POS device of claim 3, wherein the at least one processor further executes computer-executable instructions to:
   if a portion of the POS device data has been updated later than the server data, keep the portion of the POS device data stored in the at least one memory; and
   if the server data has been updated later than the portion of the POS device data, replace the portion of the POS device data with the server data.

6. The POS device of claim 1, wherein the at least one processor further executes computer-executable instructions to:
   receive, from a second customer, a request at the POS device to refund a previous transaction order; and
   block the refund of the previous transaction order from being added to the transaction queue to prevent the refund from happening when the POS device and the one or more other POS devices are disconnected from the server.

7. The POS device of claim 1, wherein the second transaction order comprises another identifier; and wherein the at least one processor further executes computer-executable instructions to:

upon determination that the another identifier is already included in the transaction queue, remove the second transaction order from the transaction queue.

8. The POS device of claim 1, wherein the at least one processor further executes computer-executable instructions to:
before adding the first transaction order from the first customer to the transaction queue, broadcast, from the POS device through the peer-to-peer network, to the one or more other POS devices that the POS device is creating the first transaction order.

9. The POS device of claim 8, wherein the at least one processor further executes computer-executable instructions to
upon broadcasting that the POS device is creating the first transaction order, wait, by the POS device, a predetermined amount of time to receive a response from at least one of the one or more other POS devices confirming awareness of the first transaction order; and
after waiting the predetermined amount of time, determine that the first transaction order is not present in any of the one or more other POS devices.

10. A non-transitory computer-readable medium comprising computer-executable instructions stored thereon that when executed by at least one processor of a point-of-sale (POS) device, cause the at least one processor to:
determine that the POS device and one or more other POS devices are disconnected from a server, wherein the POS device communicates with the one or more other POS devices via the server when the POS device and the one or more other POS devices are connected to the server;
upon determining that the POS device and the one or more other POS devices are disconnected from the server, add a first transaction order from a first customer to a transaction queue in the POS device;
transmit, through a peer-to-peer network that connects the POS device to the one or more other POS devices, the transaction queue from the POS device to the one or more other POS devices, wherein the peer-to-peer network enables communication between the POS device and the one or more other POS devices when the POS device and the one or more other POS devices are disconnected from the server;
receive, from one of the one or more other POS devices, a second transaction order including an identifier associated with an order item of the second transaction order;
determine whether the identifier is already included in the transaction queue;
upon determination that the identifier is already included in the transaction queue, remove the order item from the second transaction order;
determine that the POS device is reconnected to the server; and
upon the POS device reconnecting to the server, transmit the transaction queue from the POS device to the server.

11. The non-transitory computer-readable medium of claim 10, wherein the at least one processor further executes computer-readable instructions to aggregate additional transaction orders to update the transaction queue in the POS device based on a time of receipt of the additional transaction orders.

12. The non-transitory computer-readable medium of claim 10, wherein the at least one processor further executes computer-readable instructions to:
upon the POS device reconnecting to the server, receive, from the server, a notification that the POS device needs to synchronize with the server; and
synchronize POS device data stored in the at least one memory with server data stored in the server.

13. The non-transitory computer-readable medium of claim 12, wherein the server data and the POS device data comprise inventory data, employee information, or merchant location metadata.

14. The non-transitory computer-readable medium of claim 12, wherein the at least one processor further executes computer-readable instructions to:
if a portion of the POS device data has been updated later than the server data, keep the portion of the POS device data stored in the at least one memory; and
if the server data has been updated later than the portion of the POS device data, replace the portion of the POS device data with the server data.

15. The non-transitory computer-readable medium of claim 10, wherein the at least one processor further executes computer-readable instructions to:
receive, from a second customer, a request at the POS device to refund a previous transaction order; and
block the refund of the previous transaction order from being added to the transaction queue to prevent the refund from happening when the POS device and the one or more other POS devices are disconnected from the server.

16. The non-transitory computer-readable medium of claim 10, wherein the second transaction order comprises another identifier; and wherein the at least one processor further executes computer-readable instructions to:
upon determination that the another identifier is already included in the transaction queue, remove the second transaction order from the transaction queue.

17. The non-transitory computer-readable medium of claim 10, wherein the at least one processor further executes computer-readable instructions to:
before adding the first transaction order from the first customer to the transaction queue, broadcast, from the POS device through the peer-to-peer network, to the one or more other POS devices that the POS device is creating the first transaction order.

18. The non-transitory computer-readable medium of claim 17, wherein the at least one processor further executes computer-readable instructions to:
upon broadcasting that the POS device is creating the first transaction order, wait, by the POS device, a predetermined amount of time to receive a response from at least one of the one or more other POS devices confirming awareness of the first transaction order; and
after waiting the predetermined amount of time, determine that the first transaction order is not present in any of the one or more other POS devices.

* * * * *